US012007718B2

(12) United States Patent
El Kadiri et al.

(10) Patent No.: US 12,007,718 B2
(45) Date of Patent: Jun. 11, 2024

(54) DIAL FOR A TIMEPIECE AND METHOD FOR MANUFACTURING THE SAME

(71) Applicant: Montres Rado SA, Lengnau (CH)

(72) Inventors: Hakim El Kadiri, Saint-Blaise (CH); Thomas Froelicher, Le Landeron (CH)

(73) Assignee: Montres Rado SA, Lengnau (CH)

( * ) Notice: Subject to any disclaimer, the term of this patent is extended or adjusted under 35 U.S.C. 154(b) by 733 days.

(21) Appl. No.: 16/963,055

(22) PCT Filed: Mar. 6, 2018

(86) PCT No.: PCT/EP2018/055510

§ 371 (c)(1),
(2) Date: Jul. 17, 2020

(87) PCT Pub. No.: WO2019/149384

PCT Pub. Date: Aug. 8, 2019

(65) Prior Publication Data

US 2020/0348625 A1 Nov. 5, 2020

(30) Foreign Application Priority Data

Feb. 5, 2018 (EP) .................................... 18155191

(51) Int. Cl.
*G04B 19/12* (2006.01)
*G04B 45/00* (2006.01)
*G04D 3/00* (2006.01)

(52) U.S. Cl.
CPC ......... *G04B 19/12* (2013.01); *G04B 45/0015* (2013.01); *G04D 3/0048* (2013.01)

(58) Field of Classification Search
CPC .... G04B 19/12; G04B 19/06; G04B 45/0015; G04D 3/0048
See application file for complete search history.

(56) References Cited

U.S. PATENT DOCUMENTS

2004/0196742 A1 10/2004 Gouthier et al.
2008/0123473 A1* 5/2008 Ozawa ..................... G04G 9/00 368/80

(Continued)

FOREIGN PATENT DOCUMENTS

CH 697 210 A5 6/2008
CH 708 838 A2 5/2015

(Continued)

OTHER PUBLICATIONS

Machine Translation of JP2008128914 (Year: 2008).*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A dial for a timepiece includes a support and a mother-of-pearl sheet, the mother-of-pearl sheet having a front face and a rear face facing the support and on which a pattern has been printed. The mother-of-pearl sheet has a thickness between 50 μm and 100 μm so that the pattern printed on the rear face of the mother-of-pearl sheet appears transparently through the mother-of-pearl under normal conditions of illumination.

9 Claims, 1 Drawing Sheet

(56) References Cited

U.S. PATENT DOCUMENTS

| | | | | |
|---|---|---|---|---|
| 2009/0268566 A1* | 10/2009 | Hiroe | G01D 13/02 | 368/239 |
| 2016/0070238 A1* | 3/2016 | Dubois | G04G 17/045 | 368/84 |
| 2016/0282814 A1* | 9/2016 | Sagardoyburu | G04G 9/0088 | |

FOREIGN PATENT DOCUMENTS

| | | | |
|---|---|---|---|
| EP | 3 195 755 | A1 | 7/2017 |
| JP | 3-186789 | A | 8/1991 |
| JP | 2003-194966 | A | 7/2003 |
| JP | 2008-128914 | A | 8/2008 |

OTHER PUBLICATIONS

Office Action dated Nov. 16, 2021 in corresponding Korean Patent Application No. 10-2021-7004321 (with English Translation), 6 pages.

Combined Chinese Office Action and Search Report dated Mar. 17, 2021 in corresponding Chinese Patent Application No. 201880086852.3 (with English Translation and English Translation of Category of Cited Documents), 14 pages.

Chinese Office Action dated Oct. 9, 2021 in Chinese Patent Application No. 201880086852.3 (with English translation only), 12 pages.

International Search Report dated Dec. 6, 2018 in PCT/EP2018/055510 filed on March 6, 2018, 2 pages.

Korean Office Action dated Oct. 29, 2020 in Korean Patent Application No. 10-2020-7021963 (with English translation), 10 pages.

Korean Office Action dated Jan. 11, 2021 in Korean Patent Application No. 10-2020-7021963 (with English translation), 8 pages.

Korean Office Action dated May 26, 2022 in Korean Patent Application No. 10-2021-7004321 (with English translation), 10 pages.

Japanese Office Action dated Jun. 29, 2021 in Japanese Patent Application No. 2020-539720 (with English translation), 7 pages.

* cited by examiner

DIAL FOR A TIMEPIECE AND METHOD FOR MANUFACTURING THE SAME

FIELD OF THE INVENTION

The invention relates to a dial for a timepiece comprising a support and a mother-of-pearl sheet, the mother-of-pearl sheet having a front face and a rear face facing said support and on which a pattern has been printed. The invention also relates to a method for manufacturing such a dial, and to a timepiece comprising such a dial.

BACKGROUND OF THE INVENTION

A dial of this type is described, for example, in Swiss Patent No. CH 697 210. In this document, the pattern is formed by phosphorescent, fluorescent or luminescent light elements in order to form an image that is visible in the dark but invisible under normal conditions of illumination. To achieve this, the light elements can be applied to the rear face of the mother-of-pearl or to the substrate or be deposited in blind cavities made in the mother-of-pearl or in the substrate. The recommended thickness for the mother-of-pearl sheet is 0.4 mm. This thickness is necessary in order to make the blind cavities. Further, the mother-of-pearl sheet must be sufficiently thick so that the phosphorescent pigment layer does not appear transparently through the mother-of-pearl in daylight, in normal conditions of illumination. This thickness of mother-of-pearl gives the dial a significant thickness so that it is not possible to make ultra-thin dials for the production of ultra-thin watches.

SUMMARY OF THE INVENTION

It is an object of the present invention to overcome the aforementioned drawbacks by proposing a mother-of-pearl dial and the method for manufacturing the same making it possible to produce an ultra-thin dial and an ultra-thin timepiece, notably a watch, comprising such a dial, without impairing the characteristic appearance of the mother-of-pearl.

To this end, the invention relates to a dial for a timepiece comprising a support and a mother-of-pearl sheet, the mother-of-pearl sheet having a front face and a rear face facing said support and on which a pattern has been printed.

According to the invention, the mother-of-pearl sheet has a thickness of between 50 μm and 100 μm so that the pattern printed on the rear face of the mother-of-pearl sheet appears transparently through the mother-of-pearl under normal conditions of illumination.

Thus, there is obtained a mother-of-pearl dial decorated with an ultra-thin pattern while still preserving the iridescent nature of the mother-of-pearl and smooth appearance of the mother-of-pearl on the front face, visible to a user.

BRIEF DESCRIPTION OF THE DRAWINGS

Other features and advantages will appear clearly from the following description, given by way of non-limiting illustration, with reference to the annexed drawings, in which.

DETAILED DESCRIPTION OF PREFERRED EMBODIMENTS

Figure 1:
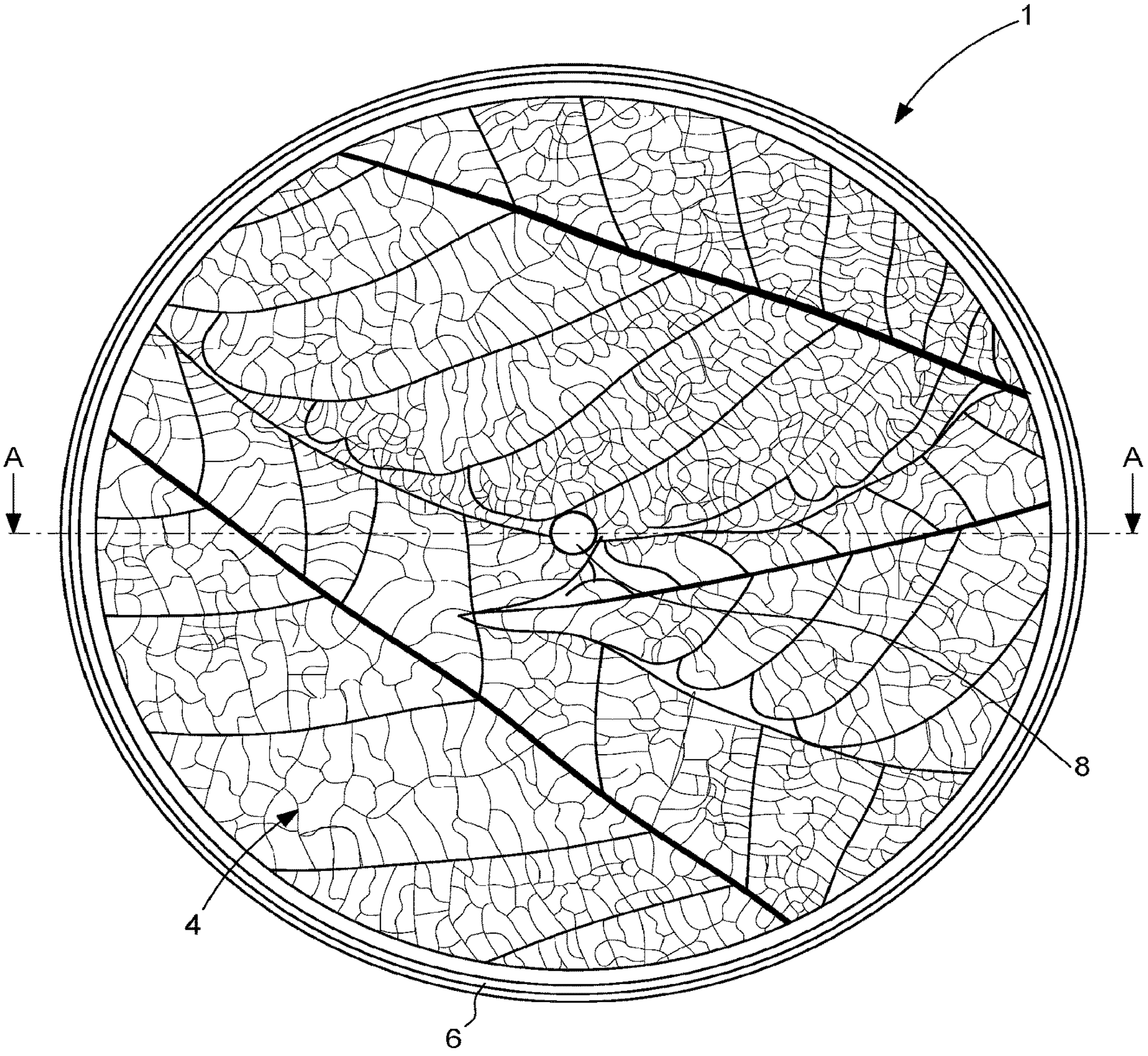
FIG. 1 is a top view of a dial according to the invention.
Figure 2:
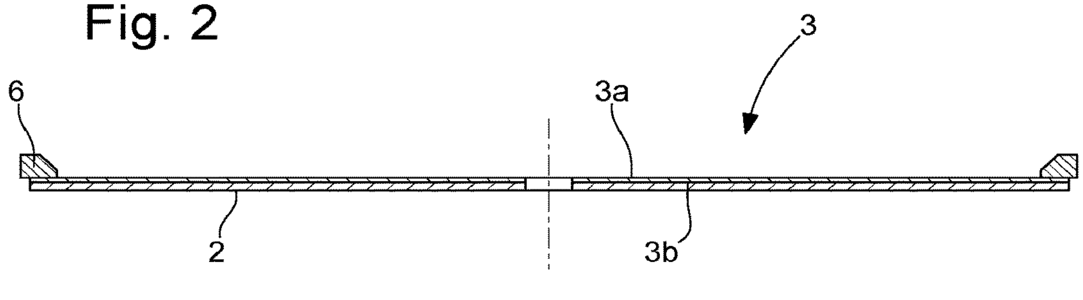
FIG. 2 is a sectional view along axis AA of FIG. 1.

Referring to FIG. 1, dial 1 for a timepiece comprises a support 2 and a mother-of-pearl sheet 3.

Preferably, support 2 is metallic. It is, for example, made from a sheet of brass.

The mother-of-pearl sheet has a front face 3*a*, corresponding to the side visible to the user, and a rear face 3*b*, positioned facing support 2 and on which a pattern 4 has been printed.

A metal ring 6, preferably made of brass, is provided on the peripheral edge of mother-of-pearl sheet 3 to define the contours of dial 1. This metal ring 6 can, for example, have a thickness on the order of 700 μm to 900 μm, for example 800 μm.

According to the present invention, the mother-of-pearl sheet has a thickness of between 50 μm and 300 μm so that the pattern printed on the rear face of the mother-of-pearl appears transparently through the mother-of-pearl under normal conditions of illumination, particularly in oblique light. Preferably, the mother-of-pearl sheet has a thickness comprised between 50 μm and 250 μm, preferably between 100 μm and 200 μm, preferably between 120 μm and 180 μm, more preferably between 130 μm and 170 μm, and still more preferably between 140 μm and 160 μm. For example, the thickness of the mother-of-pearl sheet is approximately 150 μm. Such a thickness of the mother-of-pearl sheet is a compromise found by the Applicant making it possible, on the one hand, to preserve the necessary transparency for the pattern printed on the rear face of the mother-of-pearl to appear transparently through the mother-of-pearl under normal conditions of illumination, and on the other hand, to avoid breaking the mother-of-pearl sheet, particularly when printing the pattern, due to excessive fragility.

Advantageously, metal support 2 can, for example, have a thickness on the order of 200 μm to 250 μm, so that the dial has, for example, a total ultra-thin thickness of 350 μm to 400 μm.

Printed pattern 4 can be any type of pattern. Preferably, the printed pattern is formed by a set of lines of different widths, creating the appearance of a structure. For example, the pattern may represent the veins and structure of a leaf.

Preferably, the mother-of-pearl used is natural mother-of-pearl.

Advantageously, the mother-of-pearl can be coloured.

The method for manufacturing such a dial includes the steps of:

a) providing a support 2, preferably metallic, for example made of brass b) providing a mother-of-pearl sheet 3 having a thickness comprised between 50 μm and 300 μm, preferably between 50 μm and 250 μm, preferably between 100 μm and 200 μm, preferably comprised between 120 μm and 180 μm, more preferably between 130 μm and 170 μm, and still more preferably between 140 μm and 160 μm c) printing a pattern 4 on the rear face 3*b* of the mother-of-pearl sheet d) assembling the printed mother-of-pearl sheet 3 obtained in step c) on support 2.

The method also comprises a step of assembling the metal ring 6 on the peripheral edge of mother-of-pearl sheet 3.

In steps a) and b), support 2, mother-of-pearl sheet 3 and ring 6 are cut and prepared to have the desired shape and dimensions of the dial, and the thicknesses according to the invention. Orifices 8 are also made in support 2 and mother-of-pearl sheet 3 for the passage of the arbor of the hands.

According to step c), a pattern 4 is printed on rear face 3*b* of the mother-of-pearl sheet by means of an ink deposited according to a method chosen from the group including silk screen printing, photolithography and inkjet printing. Silk screen printing is particularly preferred.

Advantageously, the thickness of the deposited ink layer is comprised between 10 μm and 40 μm, preferably between 20 μm and 30 μm. The ink used is a standard ink.

Preferably, the printing method is implemented to print a pattern formed by a set of lines of different widths to create the appearance of a structure.

Further, the method of the invention can comprise a step e) of tinting the mother-of-pearl before step c) of printing the pattern.

Once the printed mother-of-pearl sheet 3 is obtained in step c) and ring 6 is assembled on support 2 to form dial 1, the front face 3*a* of the mother-of-pearl sheet can be polished to obtain a smooth front face. Mother of pearl sheet 3 is then protected by a sapphire crystal (not represented). Indices or other decorative elements can be deposited on the sapphire crystal or on mother-of-pearl sheet 3.

The present invention also concerns a timepiece comprising a dial as described above. The invention makes it possible to obtain an ultra-thin dial, made of mother-of-pearl decorated with a pattern, while preserving the iridescent nature of the mother-of-pearl and the smooth appearance of the mother-of-pearl on the front face. The pattern appears more discreet, more delicate and more elegant transparently through the mother-of-pearl. The invention also makes it possible to obtain an ultra-thin timepiece, and particularly an ultra-thin watch, because of the use of an ultra-thin dial.

The invention claimed is:

1. A dial for a timepiece comprising:

a support;

a mother-of-pearl sheet, the mother-of-pearl sheet having a front face and a rear face facing said support and on which a pattern has been printed;

a sapphire crystal positioned on the front face of the mother-of-pearl sheet; and a ring provided around a peripheral edge of the mother-of-pearl sheet, wherein the mother-of-pearl sheet has a thickness of between 140 μm and 160 μm so that the pattern printed on the rear face of the mother-of-pearl sheet appears transparently through the mother-of-pearl under normal conditions of illumination, wherein the printed pattern is formed by a set of lines of different widths, wherein the ring has a thickness from 700 μm to 900 μm, and wherein the support has a thickness from 350 μm to 400 μm.

2. The dial according to claim 1, wherein the mother-of-pearl is colored.

3. The dial according to claim 1, wherein the support is metallic.

4. The method for manufacturing a dial for a timepiece comprising a support and a mother-of-pearl sheet according to claim 1, wherein the method includes the steps of:

a) providing a support b) providing the mother-of-pearl sheet having a thickness comprised between 140 μm and 160 μm c) printing a pattern on the rear face of the mother-of-pearl sheet d) assembling the printed mother-of-pearl sheet obtained in step c) on the support.

5. The method according to claim 4, wherein the method also includes a step e) of tinting the mother-of-pearl before step c) of printing the pattern.

6. The method according to claim 4, wherein step c) of printing the pattern is achieved using an ink deposited in accordance with a method chosen from the group comprising silk screen printing, photolithography, and inkjet printing.

7. The method according to claim 4, wherein the support is metallic.

8. The method according to claim 6, wherein the ink is deposited in a layer with a thickness comprised between 10 μm and 40 μm.

9. A timepiece comprising a dial according to claim 1.

* * * * *